Sept. 6, 1966  E. P. AGHNIDES  3,270,965
SELF-SEALING AND DEPOSIT-PROOF AERATOR
Filed Feb. 5, 1963
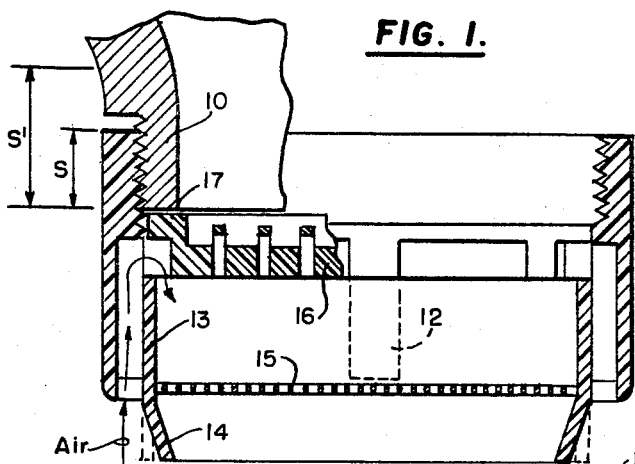
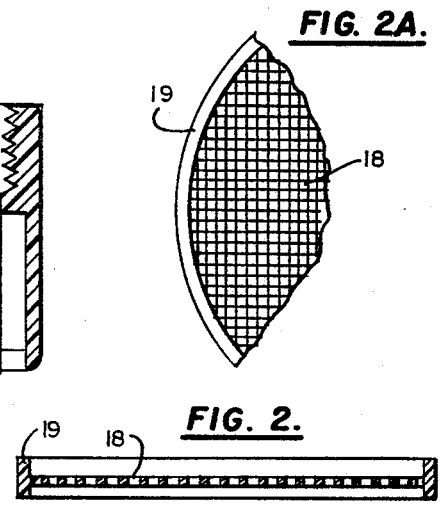
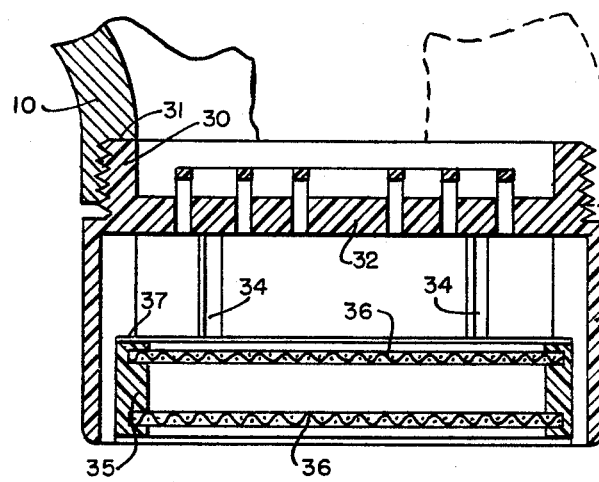
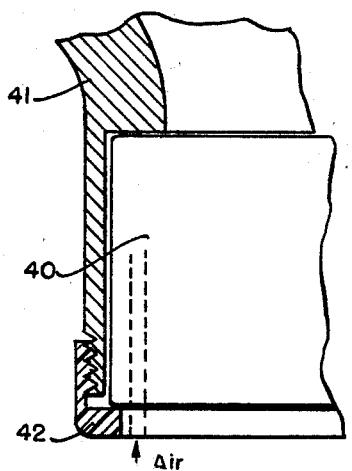
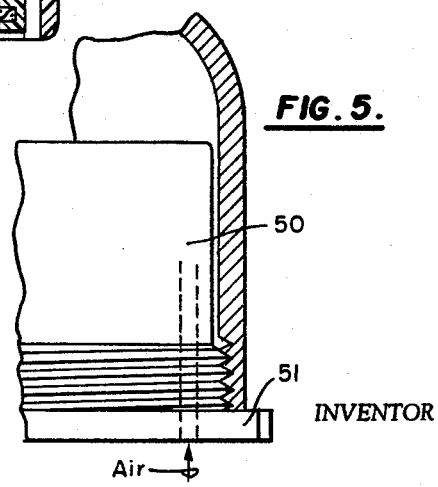
INVENTOR
Elie P. Aghnides
BY Moore, Hall & Pollock
ATTORNEYS

United States Patent Office

3,270,965
Patented Sept. 6, 1966

3,270,965
SELF-SEALING AND DEPOSIT-PROOF AERATOR
Elie P. Aghnides, 46 W. 54th St., New York 19, N.Y.
Filed Feb. 5, 1963, Ser. No. 256,343
20 Claims. (Cl. 239—428.5)

This application is a continuation-in-part of one or more of the following prior copending applications: S.N. 847,823, entitled Deposit-Proof Aerators, filed October 21, 1959, abandoned February 7, 1963; S.N. 752,458, entitled Water Taps Having Improved Aerating Spouts, filed August 1, 1958, abandoned February 7, 1963; S.N. 65,129, entitled Expendable Water Aerators, filed October 26, 1960, abandoned December 26, 1963; S.N. 117,484, entitled Aerators Having Enlarged Stream Outlets, filed May 9, 1961, now Patent No. 3,229,916; S.N. 131,413, entitled Water Aerator Having Pre-aerating Disc and Method of Making Disc, filed August 14, 1961, now U.S. Patent No. 3,130,917, issued April 28, 1964; S.N. 170,140, entitled Molded Water Aerators, filed January 31, 1962, now pending; S.N. 205,712, entitled Molded Water Aerators, filed June 27, 1962, now Patent No. 3,211,383.

One or more of the aforesaid applications is, in turn, a continuation-in-part of the following applications: S.N. 44,162, entitled Aerator With Plural Water Outlets, filed July 20, 1960 (now abandoned); S.N. 337,501, entitled Faucet Attachment, filed February 18, 1953 (now abandoned); S.N. 424,981, entitled Fluid Mixing Device, filed April 22, 1954 (now abandoned); S.N. 637,224, entitled Aerator With Unitary Molded Inner Assembly, filed January 30, 1957 (now U.S. Patent 2,962,225, issued November 29, 1960); S.N. 640,859, entitled Water Aerators, filed February 18, 1957 (now U.S. Patent 2,998,929, issued September 5, 1961); S.N. 752,500, entitled Water Aerators, filed August 1, 1958 (now U.S. Patent 2,998,933, issued September 5, 1961); S.N. 810,103, entitled Aerating Faucet, filed April 30, 1959 (now U.S. Patent 2,998,925, issued September 5, 1961); S.N. 831,588, entitled Faucet Aerators, filed August 4, 1959 (now U.S. Patent 2,998,931, issued September 5, 1961).

This invention relates to household aerators of the type used on water faucets, and more particularly, aerators of the type disclosed in my United States Patent 2,210,846, entitled "Fluid Mixing Device," granted December 31, 1937.

Aerators of the aforesaid type have threads for attaching the same to a faucet, and these threads may be on either the upper inside or the upper outside wall of the aerator casing which has heretofore been made of metal. Adjacent the upstream end of the casing, a perforated disc for projecting a large number of streamlets of water through the casing has been located. Near the downstream end of the casing there has been one or more screens on which the aforesaid streamlets of water impinge, causing the water to be finely broken up and mixed with air. The stream which has been discharged is a white coherent jet laden with numerous small bubbles.

Aerators of the aforesaid type have been on the market for over twenty years and have invariably used a metal casing, metal discs and metal screens. In some instances, a rubber body has been employed. All of the prior art commercial aerators have exhibited a number of disadvantages. For example, calcium deposits in the water (prevalent in many areas of the world) form on the metal parts clogging the screens and the perforated disc, and cementing the various metal parts together. In view of the fact that the aerator, to work properly, requires a nice proportion between the size and number of openings in the upstream disc and the number and the mesh of the screens, any substantial clogging which disrupts the desired proportioning interferes with the proper operation of the aerator. Moreover, aerators should be removed from the faucet from time to time for purposes of cleaning, and this becomes difficult when the calcium deposits cement the metal aerator body to the faucet, or some of the aerator parts to other parts.

Moreover, an aerator causes considerable back pressure in the faucet above the aerator, and in the prior art aerators this results in leakage along the threaded connection between the aerator body and the faucet. In order to eliminate this leakage, a washer has been used in the past, but the washer has not always been completely effective, and many aerators leak at their upper ends.

The primary object of this invention is to eliminate all of the aforesaid disadvantages in a simple and reliable manner.

Another object of this invention is to provide a low cost, yet more satisfactory, aerator.

A further object of the invention is to provide an aerator that will not chip dishes that accidentally are brought into contact with the aerator.

In carrying out the aforesaid objects, I mold the aerator out of plastic such as polyethylene, Delrin (a member of the acetal family of plastics), Nylon or polyvinyl chlorides. The material is, in any event, softer than the metal faucet to which the aerator is to be attached and when the threads are cut into the aerators, they are not as deep as the threads of a metal aerator would be and therefore there is self-threading to a considerable degree, as the aerator is screwed on to the faucet. As a result, the aerator makes a tight fit on to the faucet and leakage through the threads is prevented, avoiding the need of a washer.

The aerator body, the upstream disc, and the downstream screens, all being composed of a material which is resistant to calcium deposits, for example, one or more of the plastic materials hereinbefore mentioned, the aerator is not subject to clogging as in the case of prior aerators and it will last much longer without the necessity of cleaning. The aerator, moreover, can be put on and taken off from the faucet by the housewife without substantial difficulty and without the use of pliers. Since it is not necessary to tighten the aerator upon the faucet to the degree previously required (in order to press the washer firmly against the bottom of the faucet), pliers are not necessary to install the new aerator, nor are pliers necessary to remove the aerator from the faucet, as was required in the prior art. Since heretofore the aerator body had to be thick to withstand the pressure of the pliers, the new aerator body may be thinner and weaker than was heretofore required, leaving additional space in the aerator. This is important since it enables more water to pass through the aerator. This is made possible by reducing the area of the surfaces to be sealed, for with washers four surfaces are involved instead of two, and by providing new sealing means and surfaces.

When dishes accidentally come into contact with prior art metal aerators chipping or breakage of the dishes may result, but not so with the molded soft aerators of this application.

Other objects and advantages of the invention will become apparent as this description proceeds.

In the drawings:
FIGURE 1 is a cross sectional view of one form of the invention.
FIGURE 2 is a detailed view of a screen useful in connection with the invention.
FIGURE 2A is a top view of the screen of FIGURE 2.
FIGURE 3 is a cross-sectional view of a modified form of the invention.
FIGURE 4 is a cross-sectional view of another modified form of the invention.

FIGURE 5 is a cross-sectional view of still another form of the invention.

In FIGURE 1, the faucet 10 has outside threads which mate with inside threads on the body 11 of the aerator. Integral with the body 11 are a plurality of spaced ribs 12 supporting an inner cylindrical member 13 which is also integral with the body 11. As originally molded, member 13 is a true right cylinder but, if desired, after the molding is complete, the outlet portion 14 may be bent or funnelled inwardly while being heated. Supported by member 13 is a molded plastic screen 15 which may be in the same piece as the casing 11 or in a separate piece. An upstream diaphragm 16 conforming to the details of the corresponding element 14, shown in my prior United States Patent No. 2,998,929, granted September 5, 1961, entitled "Water Aerators," rests upon the upper edge of the cylindrical member 13.

In operation, water passing through the faucet 10 moves through the perforated diaphragm 16 and is projected therefrom in the form of partially aerated streamlets of water which impinge upon one or more screens 15, and the water is thereafter discharged as a coherent white jet laden with numerous small bubbles. Air enters the space between the outer wall of cylindrical member 13 and the inner wall of casing 11 and passes upstreamwardly over the top edge of cylindrical member 13 and then downwardly into the mixing space, more particularly between the webs 12 which connect members 11 and 13.

When the aerator of FIGURE 1 is screwed on to the faucet, the threads on the inner wall of casing 11 being cut in softer material than the metal threads on casing 10 are to some degree self threaded or self tapped as they are moved into position, particularly so since the threads on casing 11 are not cut as deep as would normally be the case if the casing 11 were made of metal instead of softer plastic. The result is that the aerator becomes tightly sealed onto the casing and that water cannot leak past the threads. The upstream side 17 of perforated disc 16 comes in firm contact with the lower edge of the faucet and provides an additional sealed surface stopping the flow of leakage. If a small quantity of water should leak by the surface 17, it may escape downwardly and out the air inlet far easier than it can force its way upward through the threads; and consequently there is no leakage at the upper end of the aerator. If some small streamlet of water should emerge through the air inlet, it will be directed straight downwardly parallel to and a very short distance from the outgoing coherent jet of water, and will be practically unnoticed by the housewife. This is in contrast to water squirting horizontally out of a prior art metal aerator.

The new aerator, even though it has partial self threading, may be screwed onto the faucet much easier than the prior art metal aerators. The reason for this is that the prior art aerators used a washer and it was necessary to screw the aerator on very tight to secure enough force to adequately squeeze the washer into contact with the faucet. Hence, pliers were required to properly apply prior art aerators requiring a thick, strong casing wall to stand the compressing, gripping force of the pliers. In contrast, the aerator of this application can be screwed on or off of the faucet manually and still be leakproof.

A second screen 18 of molded plastic material may be employed together with flange 19, as shown in FIGURES 2 and 2A. The unit of FIGURE 2 may be dropped in place on top of screen 15 before disc 16 is assembled into the aerator; and would be used in those cases where the screen mesh which is selected is sufficiently large that it requires two or more screens in order to perform the required mixing.

All of the component parts of FIGURES 1 and 2, except for the metal faucet 10, are made of molded plastic and preferably a calcium deposit-resistant material such as one or more of the plastics specifically enumerated above.

In FIGURE 3, the casing 10 has internal threads and the aerator body 30 has external threads. The upper end of the aerator casing 30 is screwed in to make a firm contact with the ledge 31 on the faucet so that a first sealing surface is formed between horizontal ledge 31 on the faucet and the upper horizontal part of the aerator. As before, the casing is made of one or more of said materials, which are softer than the metal faucet, and also as before, the threads in the molded casing are not originally cut as deep as they would have been cut if the casing had been made of metal and, therefore, a certain amount of self-threading or self-tapping occurs when the casing is screwed into the faucet. This seals the aerator casing to the faucet along the threads and thus prevents leakage the same as before. The aerator body is molded integrally with the upstream disc 32, which may be constructed according to the principles of one or more of the figures of my aforesaid United States Patent No. 2,998,929, and directs a plurality of partially aerated streamlets of water in a downstream direction upon one or more screens hereinafter described in detail. The casing has a depending skirt 33 which is integral therewith, and it also contains integral ribs 34. An auxiliary casing 35 (molded from one or more of said plastic materials) containing one or more screens 36 is slipped into the bottom of the aerator casing and is held in place by friction contact with ribs 34. The ribs 34 may have a ledge 37 to limit the upward movement of the casing 35. The aerator of FIGURE 3 operates in the same manner as the aerator of FIGURE 1 in all respects not otherwise specifically described; for example, air enters between the outer wall of auxiliary casing 35 and the inner wall of the main casing 33, and passes between the ribs 34 to the mixing space. The screens 36 are made of plastic thread, preferably of one or more of the plastic materials named above, in contrast with wire screens of the prior art.

In FIGURE 4, an aerator insert 40 (which may be of the type shown as unit 36, 39, 40 in FIGURE 3 of my United States Patent 2,633,343, entitled "Gas and Liquid Mixing Device," granted March 31, 1953, or unit 61, 62, 63, 64, 65 of my United States Patent 3,067,951, entitled "Aerator With Air Inlet and Water Outlet," granted December 11, 1962, for example), is held within the faucet by a soft plastic element 42 having partially self-tapping threads as described hereinabove, and in FIGURE 5 a similar aerator insert 50 is held within the faucet by the plastic member 51 which has partially self-tapping threads as previously described. In both FIGURES 4 and 5, the plastic members 42 and 51 cover the downstream metal end of the faucet and prevent chipping of dishes while the device is in use.

In all forms of the invention the screens may be molded out of plastic, or, in the alternative, they may be woven of thread composed of one of the materials named above. In all forms of the invention it is desirable to have each part of the aerators made of one or more of said materials in order to avoid calcium deposits as aforesaid.

Where desired, the yieldable plastic materials used in the various portions of the aerators can be strengthened and otherwise given a decorative appearance by mixing powdered metals with or embedding metallic strengthening structures in the yieldable plastic before it is molded. This will not increase the possibility of calcium deposits and such molding may also be employed in the fabrication of the several plastic mesh screens employed. By adding suitable powdered metal, the aerator can be given any desired color.

Instead of using threads that are simply not cut deep enough, as described above, irregular or deformed threads (not shown) may be used in each form of the invention, so that there is a self-threading or self-tapping effect when the aerator is connected to the faucet. However, the first proposal hereinabove made, namely, that the original threads are simply not deep enough, is preferable since it makes a tight fit completely along the distance S of FIGURE 1, which is the equivalent to a developed distance of S' throughout which leakage is prevented. In certain cases the thread may be as deep as in metal aerators, if desired, providing a good and direct contact is established between the spout end and the periphery of the diaphragm, as shown at 17 and 31. With male and female aerators having the diaphragm attached to the casing in a leakproof manner, sealing will be effected even when such aerators are screwed on to a spout so thin as to provide no sealing shoulder. Sealing will then be effected either by having the aerator threads less deep or by firmly applying the upper end of the aerator threads against the upper end of the threads of the spout, or preferably both, unless the female spout applies against an outside shoulder of the male aerator or the male spout applies against the periphery of the diaphragm.

Thus, leakage is prevented by the attachment of the diaphragm to the casing to maintain the air passagesways always free of water, by the elimination of the washer to reduce the sealing surfaces from four to two and by the provision of new sealing surfaces along the zig-zags of the threads.

While the aerators shown in the drawings are slotless, utilize no washers and the constituent parts are all molded, they may be slotted and use washers as well as wire mesh screens (not shown), providing the casing is in a material softer than the metal it is screwed on, to provide the additional sealing surfaces as well as to provide an aerator that will not chip dishes.

I claim to have invented:

1. A deposit-proof aerator comprising a casing adapted to be connected to a source of water which may discharge water under pressure, jet forming means and fluid mixing means within said casing jointly defining a mixing chamber said casing having air inlet means for admitting atmospheric air to said mixing chamber, said jet forming and fluid mixing means having a jet forming portion and a fluid mixing portion which are so proportioned and arranged respecting the resistance of the mixing means relative to the size and number of apertures in the jet-forming means to produce a coherent jet of water laden with numerous small bubbles and which proportioning along with the effectiveness of the aerator is impaired in event calcium deposits should clog part of the jet forming and fluid mixing means, substantially all surfaces of said casing and of said jet forming and fluid mixing means which are exposed to water from said source comprising a yieldable plastic material, selected from the group of polyethylene, acetal, and polyvinyl chlorides, resistant to the accumulation of calcium deposits thereon to thus reduce clogging and increase the life of the aerator.

2. The combination of claim 1 wherein said casing comprises a mixture of polyethylene and powdered metal.

3. The combination of claim 1 wherein said casing comprises material molded in a substantially tubular configuration, said jet forming means including an apertured disc molded as an integral portion of said tubular casing and extending across said casing adjacent the upstream end thereof.

4. A device for producing a coherent jet of water containing air bubbles comprising a casing having means to connect the same to a water tap which may discharge water, jet forming means across the casing having a number of discharge orifices that produce numerous streamlets each of which is of small cross-section as compared to the cross-section of the casing, resistance means downstream of the jet forming means and having the amount of its resistance so proportioned to the size and number of jets that a coherent jet of water containing numerous small bubbles is discharged from the casing, said device defining an air passageway for admitting air from the atmosphere to the space between the jet forming means and the resistance means, said proportioning being altered to impair the proportion between the jet forming means and the resistance means and thereby impair the efficiency of the aerator in event calcium deposits clog some of said orifices, said jet forming means and said casing being composed of a yieldable moldable, synthetic polymer plastic which is resistant to calcium deposits to thus substantially prevent clogging of the orifices in the jet forming means and insure longer efficient operation of the aerator.

5. A self-sealing and deposit-proof aerator adapted for attachment to the threaded end of a faucet discharging under pressure water which may contain minerals and especially compounds of calcium comprising: a tubular casing having an open upstream end for receiving the water discharged under pressure from said faucet and an open downstream end through which the aerated stream discharges; said tubular casing supporting adjacent its upstream end a transverse apertured jet-forming means for transforming the water discharged from said faucet into a plurality of high velocity streamlets; mixing means supported by said casing downstream of said jet-forming means and having a predetermined resistance to flow of the aerated stream therethrough relative to the number and size of apertures in said jet-forming means; said mixing means spaced downstream from said jet-forming means and defining at least in part with said jet-forming means the boundary surfaces of a mixing space; said casing defining an air inlet communicating said mixing space with atmospheric air outside of said casing; whereby atmospheric air enters said mixing space and is thoroughly admixed with the water of said high velocity streamlets in said mixing space and while passing through said mixing means causing substantially all surfaces of said jet-forming means and said mixing means and the defining surfaces of said mixing space to be constantly wetted by said mineral bearing water and thus subject to the depositing thereon of said minerals; substantially all surfaces of said casing and said jet-forming means which are exposed to water being formed of a yieldable, resilient plastic material selected from the group of polyethylene, acetal, nylon, and polyvinyl chlorides which are resistant to the accumulation of mineral deposits thereon to thereby reduce clogging, to maintain substantially said predetermined relationship between the resistance to flow provided by said mixing means and the number and size of the apertures in said jet-forming means and to facilitate the easy removal of said casing from said faucet; said plastic material having the further property of being substantially softer than the material of which said faucet is made; said casing having threads formed therein for yielding, intimate engagement with the threaded end of said faucet to thus form a long, tortuous, and tight-sealing path preventing water flow even under high pressure between said faucet and said casing.

6. A deposit-proof aerator as defined in claim 1 in which said casing is adapted to be connected to a source of water in the form of a threaded metal faucet by means of threads on the casing, the casing being made of softer material than said faucet to thus provide a seal when the casing is tightly screwed onto the threaded metal faucet.

7. A deposit-proof aerator as defined in claim 1 in which the casing is adapted to be connected to a source of water in the form of a threaded metal faucet, said casing being composed of material softer than the metal faucet and including a first sealing surface facing a portion of the faucet and forced into sealing relation therewith when the casing is screwed onto the faucet, said casing having a second sealing surface in the form of threads mating with those on the faucet.

8. A deposit-proof aerator as defined in claim 1 in which the casing is adapted to be connected to a source of water under pressure that is in the form of a metal faucet having outside threads, said casing having threads on its inside wall adapted to mate with those on the faucet, said casing including a sealing portion adapted to engage the lower end of the faucet and thus seal the aerator to the faucet and require substantially all of the water to flow downstreamwardly through the casing, said air inlet means defining an air passageway extending downstreamwardly from the threads on the casing to the bottom end of the aerator to thus discharge through said air passageway any water that should leak past the seal effected between said sealing portion and said faucet.

9. A deposit-proof aerator as defined in claim 8 in which the threads on the casing are composed of softer material than the metal faucet to effect a further seal between the casing and the faucet.

10. A deposit-proof aerator as defined in claim 9 in which said threads on the casing are distorted to effect distortion thereof and an improved seal when the casing is screwed onto the faucet.

11. A deposit-proof aerator as defined in claim 1 in which the casing is adapted to be connected to a source of water in the form of a metal faucet having inside threads and an internal ledge at the upstream end of the threads, said casing having outside threads of softer material than those of the faucet and also having a sealing surface at the upstream end of the casing which seals against said internal ledge to form a first seal when casing is screwed onto the faucet, the threaded connection between the aerator and the faucet comprising a second seal.

12. A deposit-proof aerator as defined in claim 11 in which the threads on the casing are composed of softer material than the metal faucet to effect a further seal between the casing and the faucet.

13. A deposit-proof aerator as defined in claim 12 in which said threads on the casing are distorted to effect an improved seal when the casing is screwed onto the faucet.

14. A device for producing a coherent jet of water containing air bubbles as defined in claim 8 in which said threads on the casing are distorted to effect further distortion thereof and an improved seal when the casing is screwed onto the faucet.

15. A device for producing a coherent jet of water containing air bubbles as defined in claim 14 in which the threads on the casing are composed of softer material than the metal faucet to effect a further seal between the casing and the faucet.

16. A device for producing a coherent jet of water containing air bubbles, comprising a chamber, said chamber having an inlet end adapted for connection with the discharge end of a tube containing water under pressure and the outlet end of which is adapted to discharge the said coherent jet, a diaphragm at the upstream end of the chamber having at least one orifice through which the stream of water is adapted to be forced into the chamber with substantial velocity, an air port opening into the chamber through which air is induced by the stream of water, and means in the path of the stream of water after it leaves the orifice and before it discharges at the outlet end for finely breaking up the water and for offering sufficient resistance for thoroughly mixing it with air and for thereafter uniting the aerated water to form a coherent jet having small bubbles disseminated throughout the jet, the resistance offered by the said means and the cross sectional area of the orifice being proportioned to effect the entrainment and mixing of the air with water before their discharge from the said outlet end, substantially all surfaces of said casing and of said diaphragm which are exposed to water comprising Delrin.

17. A device for producing a coherent jet of water containing air bubbles, comprising a chamber, said chamber having an inlet end adapted for connection with the discharge end of a tube containing water under pressure and the outlet end of which is adapted to discharge the said coherent jet, a diaphragm at the upstream end of the chamber having at least one orifice through which the stream of water is adapted to be forced into the chamber with substantial velocity, an air port opening into the chamber through which air is induced by the stream of water, and means in the path of the stream of water after it leaves the orifice and before it discharges at the outlet end for finely breaking up the water and for offering sufficient resistance for thoroughly mixing it with air and for thereafter uniting the aerated water to form a coherent jet having small bubbles disseminated throughout the jet, the resistance offered by the said means and the cross sectional area of the orifice being proportioned to effect the entrainment and mixing of the air with water before their discharge from the said outlet end, said casing being adapted to be connected to a tube in the form of a threaded metal faucet by means of threads on the casing, the casing being made of a material selected from the group of polyethylene, acetal, nylon and polyvinyl chlorides softer than said faucet to thus provide a seal when the casing is tightly screwed onto the threaded metal faucet.

18. A device for producing a coherent jet of water containing air bubbles comprising, a casing having an inlet end adapted for connection with the discharge end of a tube containing water under pressure and being in the form of a metal faucet having outside threads and with an outlet end adapted to discharge said coherent jet, said casing having threads on its inside wall adapted to mate with those on the faucet, said casing including a sealing portion adapted to engage the lower end of the faucet and thus seal the casing to the faucet and require substantially all of the water to flow downstreamwardly through the casing, a diaphragm at the upstream end of said casing having at least one orifice through which the stream of water is adapted to be forced into the casing with substantial velocity, an air inlet means opening into the chamber through which air is induced by the stream of water, and means in the path of the stream of water after it leaves the orifice and before it discharges at the outlet end for finely breaking up the water and for offering sufficient resistance for throughly mixing it with air and for thereafter uniting the aerated water to form a coherent jet having small bubbles disseminated throughout the jet, the resistance offered by the said means and the cross-sectional area of the orifice being proportioned to effect the entrainment and mixing of the air with water before their discharge from said outlet end, substantially all surfaces of said casing and of said diaphragm which are exposed to water comprising a yieldable, moldable synthetic polymer plastic which is resistant to the accumulation of calcium deposit thereon to prevent calcium deposits from forming which might impair the aforesaid proportioning, said air inlet means defining an air passageway extending downstreamwardly from the threads on the casing to the bottom end of the aerator to thus discharge through said air passageway any water that should leak past the seal effected between the said sealing portions and said faucet.

19. A device for producing a coherent jet of water containing air bubbles as defined in claim 18 in which the threads on the casing are composed of softer material than the metal faucet to effect a further seal between the casing and the faucet.

20. A device for producing a coherent jet of water containing air bubbles as defined in claim 19 in which said threads on the casing are distorted to effect distortion thereof and an improved seal when the casing is screwed onto the faucet.

References Cited by the Examiner

UNITED STATES PATENTS

| | | |
|---|---|---|
| 2,210,846 | 8/1940 | Aghnides. |
| 2,316,832 | 4/1942 | Aghnides. |
| 2,328,381 | 8/1943 | Jaffe _____ 210—449 |

(Other references on following page)

| | | UNITED STATES PATENTS | |
|---|---|---|---|
| 2,586,775 | 2/1952 | Benner et al. | 215—41 |
| 2,609,955 | 9/1952 | Moore | 215—43 |
| 2,664,278 | 12/1953 | Aghnides. | |
| 2,717,772 | 9/1955 | Palinos. | |
| 2,799,487 | 7/1957 | Aghnides. | |
| 2,842,347 | 7/1958 | Ripley. | |
| 2,849,217 | 8/1958 | Bachli et al. | |
| 2,900,760 | 8/1959 | Tupper | 209—233 |

OTHER REFERENCES

Polythene—A. Renfreu, editor—2nd edition, published by Qliffe and Sons, 1960.

EVERETT W. KIRBY, *Primary Examiner.*